United States Patent Office 3,798,332
Patented Mar. 19, 1974

3,798,332
PREPARATION OF HOT EXTRACTS AND USE IN BEER MAKING OPERATION
Donald H. Westermann, Brookfield, and Etzer Chicoye and Darrell R. Hoffmann, Milwaukee, Wis., assignors to Miller Brewing Company, Milwaukee, Wis.
Filed Jan. 10, 1972, Ser. No. 216,424
Int. Cl. C12c 9/02
U.S. Cl. 426—29                                13 Claims

ABSTRACT OF THE DISCLOSURE

Hop extract in, e.g., hexane, preisomerized, optionally prereduced, is extracted with aqueous KOH to give potassium isohumulate of 80%+ and preferably 90%+ purity. The hexane phase containing the remainder of the isohumulones is stripped of solvent and is suitable for kettle addition.

In order to prevent foaming during subsequent concentration, the aqueous extract containing about 6% solids is acidified to a pH less than the $pK_a$ of isohumulone and is concentrated under reduced pressure. After concentration, the material is treated with KOH to form the water soluble isohumulone salt which is added to beer post-kettle. At a critical optimum pH range, dependent upon the ratio of water to hexane phase used in the initial extraction, from 0.1 to 0.75 of the isohumulones may be extracted in the highly purified form.

A generalized technique for establishing conditions that will give such desired fractions and residues is disclosed.

SUMMARY OF THE INVENTION

The invention is directed to a novel process of "splitting" the isohumulone content of a hop extract, whereby a purified isohumulone fraction is recovered for addition to beer post kettle and the residual extract (after solvent removal) is added to the kettle.

Besides economy, the invention includes a number of technical advantages:

(1) A highly purified (typically 95%) isohumulone (as potassium isohumulate suitable for post kettle addition) is obtained in a single extraction step.

(2) Said single step easily recovers 0.1–0.75 of the isohumulones contained in the original extract. (The fact that such high purity of isohumulones is obtained only over a very narrow optimum pH range at relatively high yields is unexpected.)

(3) The final potassium isohumulate is in a form giving maximum storage stability.

(4) Except for negligible processing losses, none of the starting extract is wasted.

(5) Each of the products produced provides optimum properties for its intended use. (Maximum character of the original whole hop extract is retained for use in the kettle, and the post kettle product provides maximum utilization and clarity in the finished beer.)

(6) The relative ratio of kettle to post kettle additive is readily adjusted within a wide range by merely changing the ratio of hexane to aqueous phase when extracting the isohumulone.

In its broad concept, this invention contemplates that a given hop extract will be treated with dilute aqueous KOH so as to extract a portion (10–75%) of its isohumulone content for post-kettle addition, the balance being added to the kettle. When the post kettle extract contains 10–20% of the original starting isohumulone, a means is shown for getting this product with a purity of at least 80%; at higher extraction percentages (20–75%), purity is easily 90%, and under optimal conditions purity of this KOH extract is 95–100%, as the potassium salt, reduced or unreduced.

BACKGROUND OF THE INVENTION

Hop extracts (instead of whole hops) have been used in brewing beer for a number of years. The considerations are several fold. When whole hops are added to the kettle, the yield of isohumulone in the finished product is extremely poor (20–25% based on humulone added). However, the utilization of pure isohumulones from a pre-isomerized extract added post kettle is known to be extremely high, 70–90%. Therefore, it is highly advantageous to produce pre-isomerized and purified isohumulones for such post kettle addition. In order to use isohumulones for post kettle additions and retain clarity, a high degree of purity is mandatory. Those components of a pre-isomerized extract such as lupulones, waxes and other beer insoluble residues cause substantial turbidity when added post kettle. The concentration of these insoluble ingredients in many commercial isohumulone preparations limit the concentration which may be added post kettle.

It is known that commercial isohumulones of approximately 80% purity cannot be added post kettle in amounts exceeding approximately 10–15 p.p.m. of isohumulone without substantial increase in turbidity of the finished product. On the other hand, 30–40 p.p.m. of isohumulone of high purity, 90%+, can be added post kettle with insignificant increase in turbidity. Furthermore, it is known that impure isohumulones, when added post kettle, may cause gushing or rapid carbon dioxide release from beer.

In this invention, 20–75% of the isohumulones are extracted from the pre-isomerized extract and added post kettle but in a purity so high (at least 90%) that increase in turbidity is minimal. Furthermore, all the remaining isohumulones, plus all other residual hop material in the pre-isomerized extract is added to the kettle so that nothing is wasted and the total hop character is retained.

Retaining "the total hop character" is critical. A customer's continuing selection of a particular brand of beer is based on highly subjective considerations. The customer, consciously or unconsciously, is swayed by taste, odor, and appearance, especially clarity and foam "cling." Taste and odor are controlled by the brewing process and the brewing ingredients. Foam properties are strongly influenced by isohumulones. Similarly, one of the primary taste-controlling ingredients is of course the hop, and particularly its content of resins and oils. A beer drinker tends to choose the same brand of beer, time after time, because of the reproduction of taste, odor, and foam. Brew masters are well aware of this and for this reason make great efforts to preserve identity of these features from brew to brew. The instant invention greatly facilitates the preservation of brew identity and provides clarity, light stability, and excellent foam stability and cling in the final beer.

In the drawings, FIG. 1 is a simplified schematic diagram showing the essential process steps in a preferred embodiment, starting from a hop extract feed and concluding with addition of a first (crude) hop extract to the kettle and of a second (purified) extract post-kettle.

Figure 5:
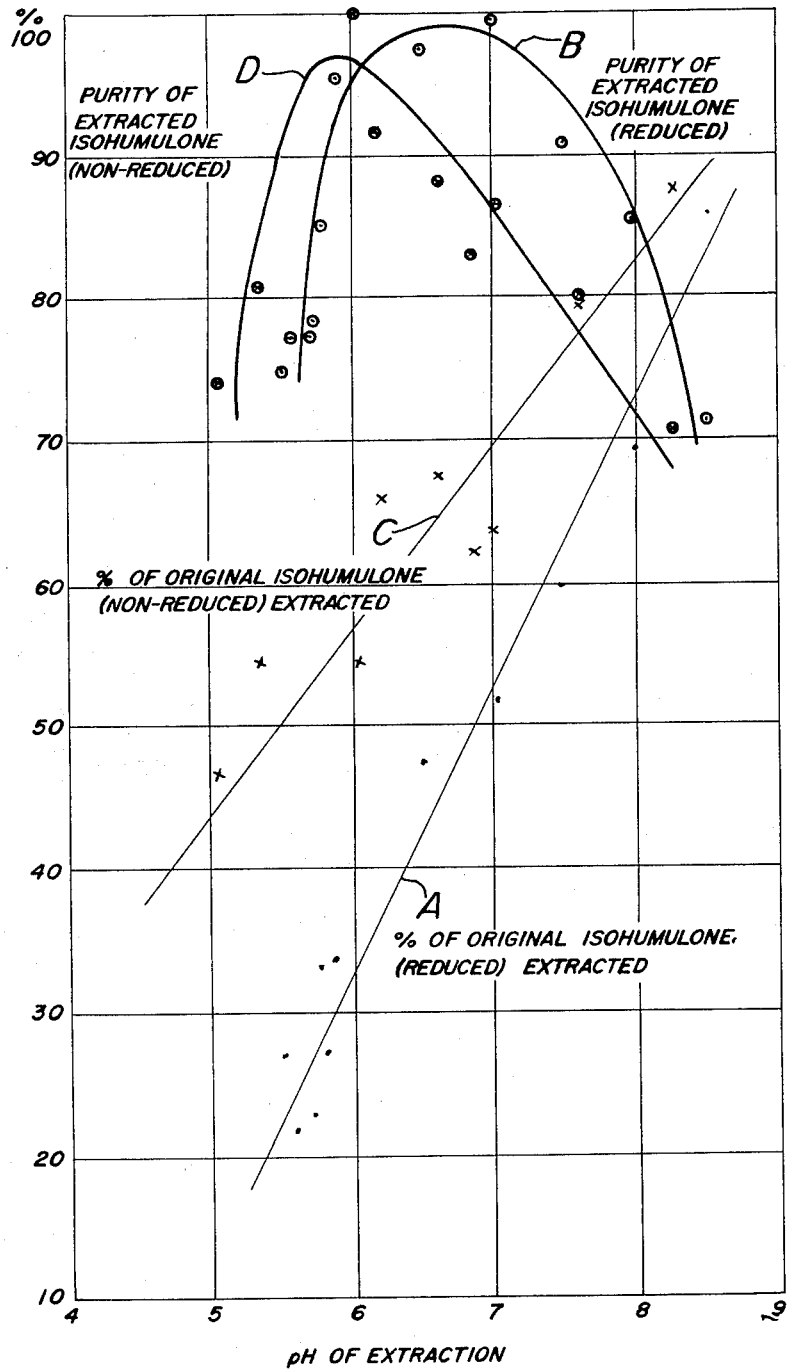

FIG. 5 correlates the percent recovery of isohumulone from a hop extract plotted against the extraction pH and the actual purity of the extract as a function of pH. Graphs for reduced and non-reduced isohumulone are presented.

The following examples illustrate without limiting the invention.

EXAMPLE 1—FOR REDUCED ISOHUMULONE

Part A.—The feed

The feed used was a hop extract in hexane (from bullion hops), previously treated to remove oils, waxes, and nonacidic hop resins, and also treated with alkaline sodium borohydride to isomerize the humulones and reduce the isohumulones. A feed of this general type can be made by various methods. The best method known to us is that described in U.S. Pat. 3,558,326, Process for Isomerizing and Purifying Hop Extracts, Westermann et al. However, the type of feed is not critical. As will be shown (cf. Example 29) a hexane hop extract from which nothing has been removed, and in which the isohumulones have not been reduced, operates equally well.

The hexane extract feed used in this example was prepared by the procedure of U.S. Pat. 3,558,326 and analyzed as follows:

Total solids, 295.9 mg./ml. solution
Reduced isohumulone, 133.2 mg./ml. solution, or 45% of solids.

Unless otherwise stated, all extracts used herein were derived from bullion hops. However, the invention is operable with all conventional hop varieties, and examples using a different variety are given later on in this specification.

Part B.—The KOH extraction

The extraction vessel was a 200 liter capacity stainless steel tank equipped with stirrer, and pH electrodes.

This apparatus was suited to a process aiming at about 25-35% recovery of the starting reduced isohumulone, such recovery being the object of the semicommercial runs of Examples 1-3. The apparatus had a round bottom, with a side spigot. This arrangement of course resulted in a small amount of aqueous phase remaining in the vessel, and this was discarded. When a more complete phase separation is desired, a vessel with a cone bottom center take off is used, or else a centrifuge such as that referred to in U.S. Pat. 3,558,326.

Fifty liters of tap water was run into the extraction vessel. Next was added, with agitation, 66 liters of hexane extract feed as described above. While the mixture was being agitated the pH was raised to 6.15 by addition of potassium hydroxide (1070 mls. of 45% aqueous KOH solution. The temperature of the reaction mixture reached 48° C. After about fifteen minutes the agitation was stopped and the two phases were allowed to separate the water phase being the lower. The phases were collected separately. The water phase contained the isohumulone as potassium isohumulate (reduced).

The above extraction procedure was repeated, this time using 51 liters of tap water and 68 liters of the same hexane extract feed. The mix was brought up to 45° C., and 1050 ml. of 45% KOH was used to bring the pH up to 6.15. A total of 94.5 liters (25 gallons) of aqueous phase at a pH of 6.15 was thus collected, together with a supernatant hexane phase.

Recovery and purity of potassium isohumulate in the two aqueous fractions were calculated as follows: The hexane feed (134 liters) contained a total of 39.3 lbs. reduced isohumulone. Of this, 10.3 lbs. were extracted into the aqueous phase, i.e., 26.2%. Of the total solids extracted, 98.5% were reduced isohumulone. (The remaining 1.5% were nonisohumulone resin components.) The extracts averaged 5 wt./wt. percent of reduced potassium isohumulate, i.e., 5 g. of reduced isohumulate per 100 g. of solution.

Part C.—Concentrating the aqueous KOH extract

The stability of an aqueous extract prepared as aforesaid is poor. On standing, the isohumulone precipitates as an oil. Curiously enough, if it is concentrated, for example, under reduced pressure to at least 30%, and preferably to 35-38% solids or higher, it then becomes stable. However, it is extremely difficult to concentrate under reduced pressure because it begins to foam badly as soon as boiling is initiated. We have, however, found a simple means of foam control that permits concentration at reduced pressure. This discovery is one of the preferred embodiments of this invention. The solution lies in converting the potassium isohumulate (which may or may not be reduced) back into the acid or isohumulone form. This is done by addition of hydrogen ions (conveniently supplied by sulfuric, hydrochloric, or other strong acid), in sufficient quantity to bring the pH of the solution below the pKa of isohumulone, which pKa is about 3.6-3.7. Thus, acid addition to a pH of about 3.0-3.2 is quite satisfactory. Lower pH's are of course operable, but unnecessarily increase the amount of acid to be neutralized after the concentration is complete.

Following this procedure, the aqueous KOH extract prepared as in Part B above was treated with sulfuric acid to bring the pH down to about 3. This resulted in throwing the isohumulone out of solution as a supernatant oil. The concentration thus was carried out on a two phase system. The liquid was charged to a force circulation evaporator (a 10 square foot shell and tube heat exchanger with steam on the shell side), which was run at a recirculation rate of 6 gallons per minute at a vacuum of 25 inches of Hg, and at a temperature of about 130-135° F. At these conditions the water was evaporated at ½-liter/min. with zero foaming. Evaporation was continued until the liquid volume was a little less than 10 liters. Forty-five percent (45%) KOH was then added to a final pH of 8.6. (Comment: Final pH should be at least 7 and can be as high as 11.) This put the isohumulone oil back in solution as potassium isohumulate (in this case, reduced isohumulate). A total of 10.25 liters of extract of 37.4% (wt./wt.) isohumulone having a purity of 93.7% was obtained. This concentrate is stable during storage for many weeks. This behavior is in marked contrast to the sodium isohumulates, which do not form similar solutions.

In addition to improving isohumulone stability, concentration in the foregoing manner also serves to remove residual traces of hexane and/or other solvent. For example, n-hexane content of the concentrated extract is typically less than 30 p.p.m.

Part D.—Addition to beer

Materials similarly prepared as per parts A, B, and C above were used to brew two 560 barrel commercial brews according to the following procedure.

A product equivalent to the residue resulting from the KOH extraction of Part B above was added at the rate of 38 p.p.m. of reduced isohumulone (based on extinction coefficient) to the kettle in each of two 560 barrel brews. At kettle knock out the wort contained on the average 18.2 p.p.m. of isohumulone. After fermentation, approximately one thousand barrels from these combined brews were used for subsequent post kettle addition of the purified potassium salt of isohumulone. Fifteen p.p.m. (15 p.p.m.) of reduced isohumulone as an approximate 35% potassium salt solution equivalent to that prepared in Part C was added to these thousand barrels after primary filtration. The thousand barrels were aged, final filtered and commercially packaged. The finished product contained 29.6 p.p.m. of reduced isohumulone (based on extinction coefficient). These additions reflected a utilization of 47.8% and 75.8% for the kettle addition and post kettle additions respectively.

The finished beer had superb taste, excellent light stability, foam stability, and foam cling characteristics.

EXAMPLE 2

An extraction similar to that of Example 1 was carried out, except that the extraction pH was 5.9 and the extraction temperature was 40-45° C. A total of 137 liters (36.2 gallons) of hexane extract feed was used, with a total of 102.5 liters of tap water, and a total of 2420 ml. of 45% KOH. A total of 111 liters (29.3 gallons) of aqueous phase at pH 5.9 was collected. In this case 28.5% of the original reduced isohumulone in the feed was extracted and the solids in the aqueous phase contained 51.2 mg./ml. of solids analyzing 96.2% reduced isohumulone.

EXAMPLE 3

The procedure of the prceeding examples was carried out, except that the extraction pH was 5.95 and the extraction temperature was 35-40° C. The feed was the same as that used above; a total of 53.1 gallons (201 liters) was extracted in 3 roughly equal batches, using a total of 151 liters of tap water and a total of 3200 ml. of 45% KOH. A total of 40.8 gallons (155 liters) of pH 5.9 was collected. This had a concentration of 46.2 mg./ml., or 4.62% solids, analyzing 95.9% reduced isohumulone. Isohumulone recovery was 25% (of the original isohumulone).

EXAMPLE 4

Feed: 1 liter of hexane solution of borohydride reduced extract analyzing 295.2 mg./ml. solids; of the solids, 50.6% were reduced isohumulone.
Tap water, 750 mls.
45% KOH, 20 mls.

The hexane extract feed was combined with the tap water and the mix was heated to 50° C. while agitating, and then the 45% KOH was added, which brought the pH up to 5.95. The phases were split in a conical separator, resulting in 810 mls. of aqueous phase and 935 mls. of hexane phase. The phase split was very clean. The aqueous phase contained 31% of the original isohumulone at a purity of 93.8%.

EXAMPLE 5

The procedure used in the preceding example was repeated, except that an extract of old hops (8 months old) was used. Some solid extract from a borohydride reduced hop extract was made up to 1 liter with hexane. 994 mls. of this extract was combined with 750 mls. of tap water and was heated to 50° C. while agitating. The addition of 19 mls. of 45% KOH brought the pH up to 6.05. The phases were split (very clean) with a resulting 815 mls. of aqueous phase and 940 mils of hexane phase. The aqueous phase contained 32% of the original isohumulone at a purity of 96%. In this example, the hexane feed contained 335.2 mg./ml. solids, and of the total solids, 44.7% were reduced isohumulone.

EXAMPLES 6-16

The feed of Example 1 was used in the following bench-scale examples which aimed at establishing pH parameters for obtaining reduced isohumulone purities of at least 90%. The procedure used in all the runs was as follows: 100 ml. of hexane extract feed and 75 ml. tap water were combined. To this was added 45% KOH (only a few ml. required) until the desired pH was reached. After 5-10 minutes agitation at room temperature the phases were allowed to split in a separatory funnel, and the resulting aqueous phase analyzed. The hexane phase was not analyzed, but our work has shown that the process causes no loss of isohumulone, i.e., that within experimental limits the isohumulone extracted into the aqueous phase and the isohumulone left in the complementary hexane phase add up to the original isohumulone in the original extract.

Results are given in Table 1, following, and also appear as Curves A and B in FIG. 5.

TABLE 1

| Example: | Extraction pH | Percent of original isohumulone extracted | Purity of extracted material (percent) isohumulone |
| --- | --- | --- | --- |
| 6 [1] | 5.5 | 27.0 | 74.8 |
| 7 | 5.6 | 21.9 | 77.1 |
| 8 | 5.8 | 22.6 | 77.2 |
| 9 | 5.75 | 33.0 | 78.3 |
| 10 | 5.8 | 27.8 | 85.0 |
| 11 | 5.9 | 33.4 | 95.5 |
| 12 | 6.5 | 47.4 | 97.4 |
| 13 | 7.0 | 51.8 | 99.2 |
| 14 | 7.5 | 59.2 | 90.7 |
| 15 | 7.95 | 69.2 | 85.1 |
| 16 | 8.5 | 85.9 | 71.2 |

[1] Average of 2 runs.

EXAMPLES 17-25

Hops were extracted with hexane and isomerized in the known way but without borohydride reduction. A 750 ml. aliquot of this extract containing 41.7% solids or 2.71 lbs. of solid/gallon solution (780 milligrams/ml. specific grav.) was combined with 750 ml. of water. To this was added 37 mls. of 50% NaOH bringing the pH to 12.0. The two liquid phase system was heated to 57° C. and held under total reflux for a period of two hours. The phases were split and 550 mls. of the hexane phase containing oils, waxes and other non-acidic components was withdrawn.

The remaining 890 mls. of aqueous phase was returned to a separatory funnel and 750 mls. of fresh hexane added. To this combined two liquid phase system was added 30 mls. of 36 N sulfuric acid bringing the pH of the aqueous phase to 1.1. The phases were intimately mixed and aliquots of the hexane phase were withdrawn for subsequent extraction with dilute KOH at various pH's by processes analogous to that of Part B above. The amounts of non-reduced isohumulone extracted as a function of pH of the aqueous phase are shown to be similar to those for extraction of reduced isohumulones; however, certain differences are evident. Firstly, purities in excess of 90% are obtainable within a more limited pH range (viz., about 5.5-6.7 as compared to about 5.7-7.8 for reduced isohumulone). Secondly, the fraction of isohumulone recovered within the operable purity range (at least 90%) is lower for a given pH for reduced isohumulone.

The results are shown in Table 2 following and also are presented graphically in FIG. 5 as Curves C and D.

TABLE 2.—ISOMERIZED—UNREDUCED EXTRACT

Extraction runs

| Example: | Extraction pH | Percent of isohumulone extracted | Percent purity of extracted isohumulone |
| --- | --- | --- | --- |
| 17 | 5.05 | 46.5 | 73.9 |
| 18 | 5.35 | 54.2 | 80.5 |
| 19 | 6.03 | 54.2 | 100.0 |
| 20 | 6.20 | 65.6 | 91.3 |
| 21 | 6.62 | 67.3 | 88.0 |
| 22 | 6.85 | 62.0 | 82.6 |
| 23 | 7.00 | 63.7 | 86.1 |
| 24 | 7.60 | 79.3 | 79.9 |
| 25 [1] | 8.24 | 87.8 | 70.7 |

[1] Average of 2 runs.

The reduced isohumulone curves

We refer again to curves A and B in FIG. 5. These two curves show the average results of a very large number of extraction experiments. The straight line, showing percent of reduced isohumulone at various pH's, holds no surprises. Nevertheless, a few words with reference to it are in order. As shown, all isohumulone will be extracted using dilute KOH at a pH of about 9.7. The extracted product would, of course, consist of all acidic material in the starting extract, and would therefore include all the isohumulones and all the lupulones. Such product would analyze about 50% pure and be worthless for post-kettle addition. It could be added to the kettle, of course, but if this were the original purpose, the extraction would be completely superfluous and simply an added expense.

Following the percent recovery curve again, suppose the extraction to be carried out at a pH of 8, here the recovery is low (70%), and the purity is still unacceptable (85%). As still lower pH's are used, however, an interesting phenomenon begins: recovery drops and purity improves up to an optimum range. However, further decrease in pH causes a totally unexpected decrease in purity although the yield continues to decrease. Indeed, at a pH in the range of about 5.8 to 7.8, purity is remarkable, being at least 90%. In this range (which we call the "recovery range"), however, recovery is admittedly poor, being a low of about 25–30% at about pH 5.8, reaching a maximum (having acceptable purity under these particular conditions) at pH of about 7.8, i.e., a recovery of about 65–70%. As pH's below about 5.8 are used, both purity and yield decrease.

Returning now to the "recovery range," it will be immediately evident that under these conditions a rather narrow pH range is contemplated. The very narrowness of this range probably helps account for the failure of prior practitioners to discover this invention. This pH purity curve also helps explain why plural alkali extractions of the same starting hop extract are doomed to failure. For example, we have found that if we make an extraction of unreduced isohumulone at a pH in the recovery range of, say, 7.5 (where we get about 75% recovery) and then attempt a second extraction on the residue at a slightly lower pH (say, 7.0), the second extract will have a purity lower than predicted by the curve, i.e., something of the order of 50% purity. Succeeding extracts will be even worse. Yet, as we have shown, when the extraction is done exactly right the purity is remarkable, and both extract and residue are useful. The "secret," of course, is to make only one extraction, and to do it under exact conditions.

A generalized procedure

With the procedures herein described, any conventional preisomerized hop extract in a water immiscible solvent (i.e., hops extracted with a hop solvent and isomerized) can be treated with dilute aqueous KOH to give two products, viz., (A) a KOH extract containing potassium isohumulate, and
(B) the hop residue.

Product (B) can be added to the kettle, and Product (A) can be added post kettle. In making the KOH extraction on a new hop variety, or on a hop extract prepared via a new solvent, the following steps can be carried out to establish operable parameters:

Samples of the feed (preisomerized hop extract in water immiscible solvent, optionally reduced) are treated with dilute aqueous KOH, at differing pH's, suitably between 4 and 9 to establish "fraction extracted" and purity curves like those in FIG. 5. The two intersections of the purity curve with the 90% purity ordinate, taken with the projections of these intersections on the "fraction extracted" curve, will show the range of KOH-extracted fractions that will have the requisite 90% purity. In making these exploratory curves, an aqueous KOH:hop extract volume ratio of 0.75–1.00 is generally the most useful.

Cluster hops, EXAMPLES 26–28

In one demonstration of the aforesaid concept, we undertook extractions on a preisomerized, dewaxed, unreduced isohumulone extracted from a cluster hop in hexane. The variable was the hop variety, since all of our other work (Examples 1–25) had been done on bullion hops.

Following isomerization, the extract was solvent stripped and aqueous extractions were made at 3 pH's, with the following results:

| Example | Extraction pH | Product purity | Percent original isohumulone extracted |
|---|---|---|---|
| 26 | 5.50 | 96.7% isohumulone | 27.9 |
| 27 | 5.82 | 100% isohumulone | 45.8 |
| 28 | 6.42 | do | 69.0 |

Since we obtained excellent results over the rather narrow pH range studied, it was not necessary to establish the "90% purity" intersections. Each of the runs gave a product of the requisite purity and with a "percent extracted" adequate for post kettle addition, and left a complementary residue suitable for kettle addition. It is interesting to note that, with cluster hop, under the conditions stated, the "fraction extracted" curve (although not plotted on any of the figures) has a considerably steeper slope than that for bullion hops, indicating that a greater amount of pure unreduced isohumulone can be recovered when working with cluster hops.

It will be noted that a change in this one variable (hop variety) gives rise to another "family of curves" (see below) with further slight variations to be expected in changing the water:hexane volume ratio with this hop variety. As we have explained, however, such variations are readily determinable and in no case affect the basic operation of the invention.

EXAMPLE 29

Undewaxed, unreduced cluster hops

As a further check, we made a run using the same feed as the last 3 preceding Examples 26–28, except that it had not been dewaxed. Excellent results were obtained the very first time, so that it was unnecessary to make a complete "percent purity" and "Fraction extracted" curves.

Procedural details follow:

The purpose of this example was to "split" an unreduced hop extract which had not been dewaxed.

Preliminary: Preparation of undewaxed unreduced extract 400 gms. of undewaxed hop extract was made up to 1 liter with hexane. This and 1 liter of tap water were put into the flask. To this was added 60 mls. of 50% NaOH which brought the pH up to 11.9. While agitating vigorously, the temperature was raised to 62° C. and this was held under total reflux for 2⅓ hours. To this was then added 40 mls. of 36 N $H_2SO_4$ which brought the pH down to 1.65. The phases were then split and 710 mls. of hexane phase was collected. This was not all of the hexane phase since some emulsion had formed which no attempt was made to save.

KOH extraction 100 mls. of the above hexane phase and 75 mls. of tap water were put into a flask. This was heated to 50° C. and the addition of 3.4 mls. of 45% KOH brought the pH up to 6.05. The phases were split with a resulting 90 mls. of aqueous phase.

The hexane phase was used to make a series of phase splits by the general procedure given for previous examples. A KOH extract was obtained with a purity of 98.0%, and it contained 46.3% of the original isohumulone for the aliquot. As far as the physical handling of the phase split is concerned, there is no difference between undewaxed and dewaxed material.

Continuous operation (EXAMPLES 30–31)

Instead of the batch extractions above described, a continuous extraction can be used. In such extraction it is essential to follow the same principles stated for the batch extractions, viz., one and only one extraction is to be made, and it is to be made at a substantially constant pH within the range of about 5.8 to 7.8 for reduced hop extract. There are several ways to proceed with the extraction. In one rather simple variation Example 30, below, the extraction is carried out by starting in a "heel" consisting of a preformed batch extraction product. The hexane extract and the KOH solution are charged separately with intimate mixing in the heel, and the vessel is allowed to fill and to overflow. The effluent contains the two desired phases, and these are separated and worked up as for the batch examples. It will be evident that this mode continuously maintains the desired pH.

EXAMPLE 30

A hexane extract of sodium borohydride reduced isohumulone containing 295.9 mg./ml. of solids, of which 45% of the solids or 133.2 mg./ml. is reduced isohumulone, is fed to 100 ml. vessel at a rate of 10 ml./min. Simultaneous with this flow, a second stream of aqueous KOH containing 1.36% KOH wt./wt. is fed to the same vessel at a flow rate of 7.73 ml./min. The 100 ml. capacity vessel is continuously agitated to thoroughly intermix the two phases. The two phase system is allowed to fill the vessel and overflow. The effluent containing the two phases is separated and worked up as for the batch examples.

In another embodiment (Example 31, below), the hexane extract and the KOH solution are charged separately to the bottom of an elongated reaction column.

EXAMPLE 31

Flow rates similar to those indicated in Example 30 are used for the continuous co-current extraction of isohumulones as follows. Each stream at the same concentration and flow rate respectively as described in Example 30 is charged to the bottom on an elongated packed reaction column. The volume of the interstices within the column is such that the hold up time allows efficient intermixing of the two phases. Furthermore, the column size is such that the velocity of the two phases flowing cocurrently through the column is sufficiently high to prevent separation of the two phases by gravity. The product is taken off the column and the two phases are separated and worked up as above. This procedure has the theoretical advantage over that of Example 30 in that the final extraction product is free from fresh incoming product. However, this difference is of no great moment, since we aim not at complete recovery, but rather at purity of product. And the latter object is attainable by either procedure.

PREFERRED EMBODIMENTS OF THE INVENTION

As we have mentioned, our invention will result in the extraction of specified fractions of the isohumulone or reduced isohumulone from a water-immiscible extract, with a purity of at least 90%. (In a special case a product with as much as 20% impurity can be made and used, within the scope of the invention, as will be explained.) In attaining these objectives certain conditions are absolutely required, and others are merely optimal or preferred.

Furthermore, within the ranges or conditions broadly recommended there are frequently more narrow limits that give the best results. These considerations are discussed below.

(1) The feed.—The feed can be substantially any hop extract in conventionally acceptable hydrocarbons and chlorinated hydrocarbon solvents. As is well recognized, a number of such hop solvents are known. These are technically suitable for the process of this invention. Hexane, however, remains the solvent of choice because of its cheapness, physiological inertness, and ease of recovery for reuse. The invention is exemplified throughout using hexane. The loading of hop solids in the solvent can vary over a wide range. A preferred solids:solution range is 250 to 350:mg. solids per ml. of solution (the solution including the solids). The procedure of U.S. Pat. 3,558,326 is quite suitable; as there stated, in 88 gallons of hexane extract solution there is contained 149 lbs. of hop solids of which 73 lbs. is sodium borohydride reduced isohumulone; this is equivalent to 292 mg. solids/ml. solution, 143 of the 292 mg. being reduced isohumulone.

Figure 1:
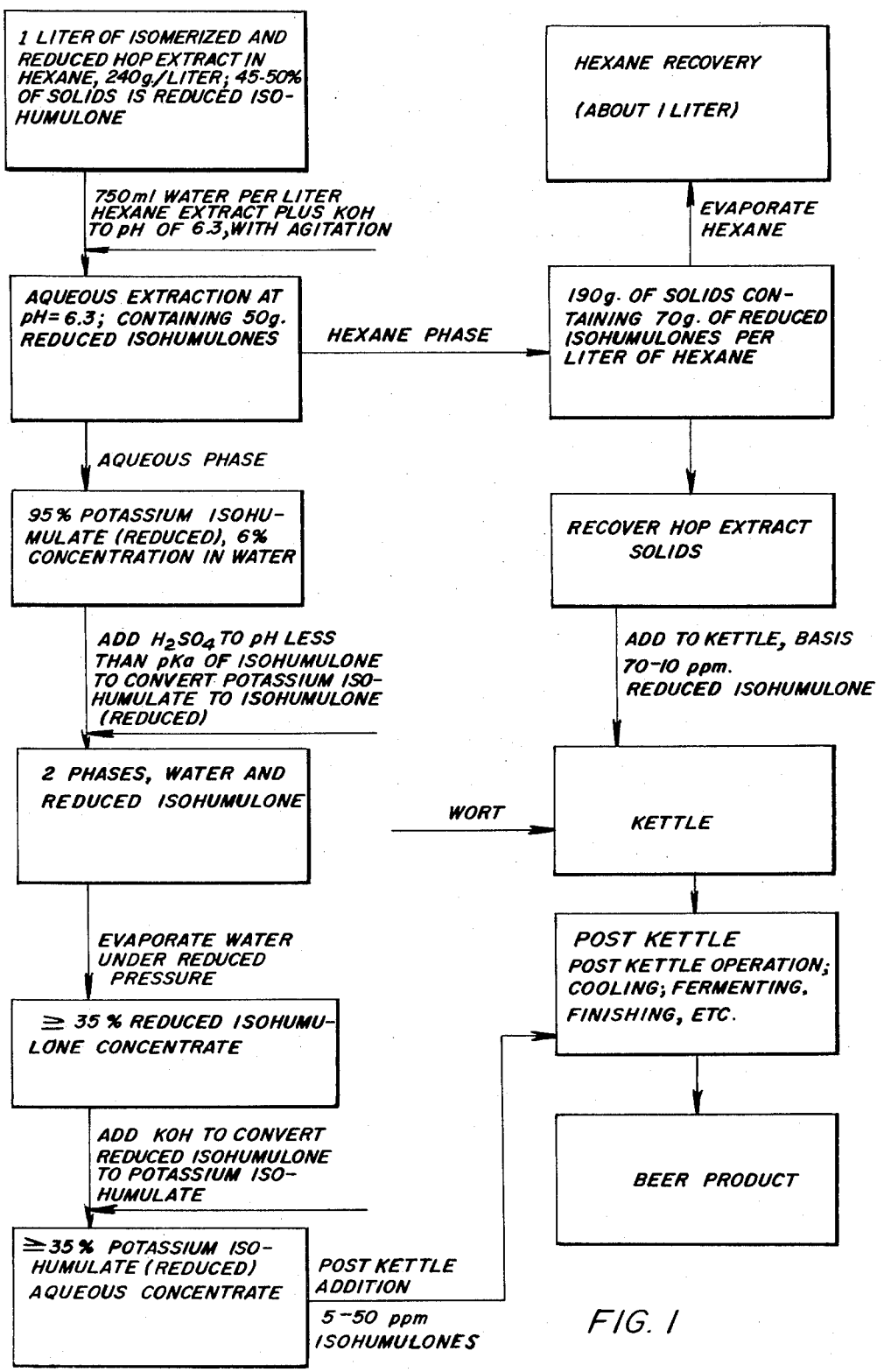
Figure 2:
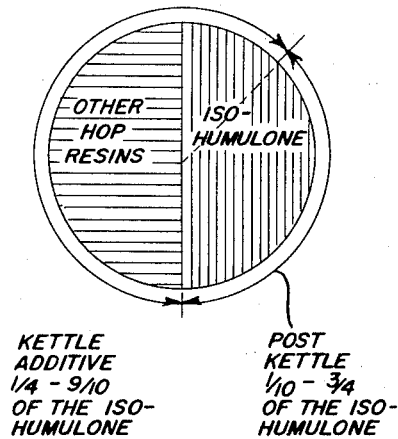
FIG. 2 shows in a simple diagrammatic form the composition of the starting hop extract, and the make-up of the two fractions following KOH extraction, and how they are added to the brewing system.
Figure 3:
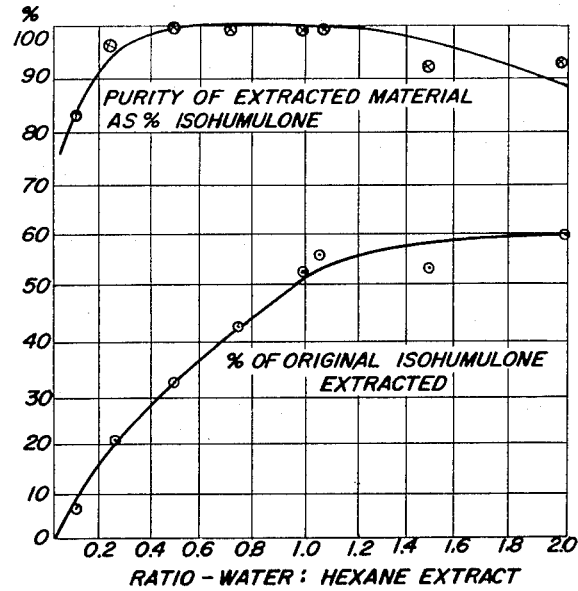
FIG. 3 shows the effect of varying the amount of water used in the KOH extraction.

(2) The water:hexane extract ratio.—As we have mentioned, the data shown graphically in FIG. 3 were derived from extractions done at a pH of approximately 6.35 on reduced isohumulone. The following table is the data obtained.

TABLE 3

| Example: | Ratio water/ hexane | Percent of original isohumulone extracted | Percent purity of extracted material |
|---|---|---|---|
| 32 | ¹0.10 | 7.0 | 82.4 |
| 33 | 0.25 | 20.7 | 96.0 |
| 34 | 0.50 | 32.4 | 100 |
| 35 | 0.75 | 42.1 | 99.2 |
| 36 | 1.00 | 51.8 | 100 |
| 37 | 1.25 | 54.6 | 100 |
| 38 | 1.50 | 51.9 | 92.2 |
| 39 | 2.00 | 59.7 | 92.4 |

¹ Average of 2 runs.

From this data it appears that a preferred water/hexane ratio would be 1. There is not much gain in quantity extracted at ratios higher than 1 and there also appears to be some decrease in the purity of the extracted material at the 1.5 and 2.0 ratios. The other consideration is the quantity of water which would have to be evaporated at the high ratios. Since this is a fairly costly operation, it would be advisable to keep this as low as possible. In this connection, it may be noted that water:hop solvent ratios of 0.1–3:1 are operable, but that ratios of the order of 3:1 would be disadvantageous for the reason mentioned.

Families of curves

When holding a given variable constant (e.g., water:hexane ratio) for a specific hop variety, we find that, by varying the pH of extraction, we get specific curves for percent isohumulone extracted and purity of the extract. If a different hop variety is used, then the curves may shift slightly. The water:hexane ratio data of FIG. 3 and in Table 3 were done at a pH of 6.35. When the same runs are made at a slightly different pH, e.g., 6.0, the curve is slightly shifted, and the same occurs at other slightly different pH's, e.g., 6.5, 7.0, etc. A family of "parallel" curves results. This shift is generally no more than a few percent of the value in question and in general need not be taken into account, particularly when operating in our optimal or preferred ranges. As an instance of this shift, consider the curves in FIG. 5. The data there are based on extractions at a water:hexane ratio of 0.75. However, as we have mentioned, water:hexane ratios as low as 0.2 or even 0.1 are operable. When using these lower ratios, the purity curves B and D may be shifted very slightly and may intersect the 90%-purity line at slightly different points, amounting to a few tenths of a pH interval. Thus, whereas curve B for reduced isohumulone as shown covers a pH range of about 5.8 to 7.8 (at 90% purity), this value is realistically variable from about 5.5 to 8.1. Similarly, although curve D for nonreduced isohumulone as shown covers a pH range of about 5.5 to 6.7 (at 90% purity), this curve is realistically variable from about 5.2 to about 7.0. The extraction curves A and C obviously depend upon the water:hexane ratio used.

In view of the discussion above it is readily understood that the water:feed ratio which is chosen for process operation will dictate the amount of pure isohumulone which is recovered. We also emphasize that a given water:feed ratio produces a specific amount of pure isohumulone recovered, when a specific pH of aqueous phase is used. In other words, we have three variables which need to be controlled in order to give a specific percent of the original isohumulone recovered as pure material, viz. water:feed ratio, pH of the aqueous system, and hop variety.

"Splitting" isohumulone at fractions of 0.1–0.2 (a special case)

Recovering a fraction of isohumulone less than 0.2 presents a special situation. As will be noted from FIG. 3 (data taken at pH=6.35), such fraction is readily obtained simply by reducing the water:hexane ratio below about 0.2. It will also be noted that the purity drops below 90%; nevertheless, in certain cases, such material is still useful as a post kettle additive, and the residue is useful for kettle addition, in perfect analogy to the procedure described in Example 1, Part C. The reason that it is useful will be evident when one considers that the total amount of impurities added with the isohumulone quantitatively is quite small, since the amount of isohumulone itself is small. For this reason, our invention is operable when recovering as low as one tenth of the isohumulone content of a hexane hop extract, it being understood that in the range of 0.1–0.2, the purity is 80–90%, compared to at least 90% at higher fractional recoveries. Although this is equivalent to impurities (including haze-forming lupulone) of up to 20%, the amount of such impurities is still quantitatively no higher than that present in a 90% pure fraction, because the former is added at only half the rate (or less) of the latter.

This "special case" is not limited to extractions at pH=6.35. And some similar extractions even give purities comparable to those at much higher water:hexane ratios, as shown in the next example.

EXAMPLE 40

One liter of feed similar to that used in Example 1 was combined with 200 mls. of tap water and the mix was heated to 50° C. while agitating. The addition of 17 mls. of 45% KOH brought the pH up to 6.1. The phases were split with a resulting 227 mls. of aqueous phase, 830 mls. of hexane phase and 125 mls. of interface. The aqueous phase contained 13.7% of the original isohumulone at a purity of 96.2%.

(3) Temperature of KOH extraction.—Temperature (within reasonable and customary ranges) apparently is not critical and has little effect on either percent product recovered or purity of product. As shown in certain of the examples summarized in Table 4 below, results at room temperature (about 23° C.) (Example 41) and 50° C. were all good. The higher temperatures may accelerate the extraction somewhat, but otherwise their use is probably not justified. Excessively high temperatures (e.g., of the order of 100° C. invite risk of some product loss owing to thermal degradation. Furthermore, temperatures above the normal boiling point of a water:hexane system (which is 61° C.) creates the unnecessary need for pressurizing the process. These considerations apply to both reduced and nonreduced forms of isohumulone.

TABLE 4

| Example number: | Temp., °C. | Extraction pH | Percent of original isohumulone recovered | Purity of recovered fraction, percent isohumulone |
| --- | --- | --- | --- | --- |
| 4 | 50 | 5.95 | 31 | 93.8 |
| 5 | 50 | 6.05 | 32 | 96.5 |
| 40 | 50 | 6.1 | 13.7 | 96.2 |
| 41 | ca. 23 | 5.95 | 32 | 100.0 |
| 3 | 35–40 | 6 | 25.1 | 95.9 |
| 2 | 40–45 | 5.9 | 28.5 | 94.2 |
| 1 | 45–48 | 6.15 | 26.2 | 98.5 |
| 9 | ¹ 40–45 | 5.9 | 33.4 | 95.5 |

¹ Actually executed at room temperature, but the fluids were still hot from previous steps.

(4) Effect of PH on the KOH Extraction.

The control of pH is absolutely essential. As we have indicated, and depending on water:hexane ratio and hop variety, for reduced isohumulone of at least about 90% purity the extraction (from hexane) is preferably made at a pH of about 5.8 to 7.8. Within this range a pH of about 6.6 will give the highest purities, typically at least 95%. For nonreduced isohumulone (from hexane), the preferred pH range is about 5.5 to 6.7, and the optimal pH is about 6. When the hop extract is in trichlorethylene, on the other hand, the optimal pH is none of the above, but is about 8.

As we have emphasized, the proper pH depends on several variables, but is readily established by our "Generalized Procedure."

Figure 4:
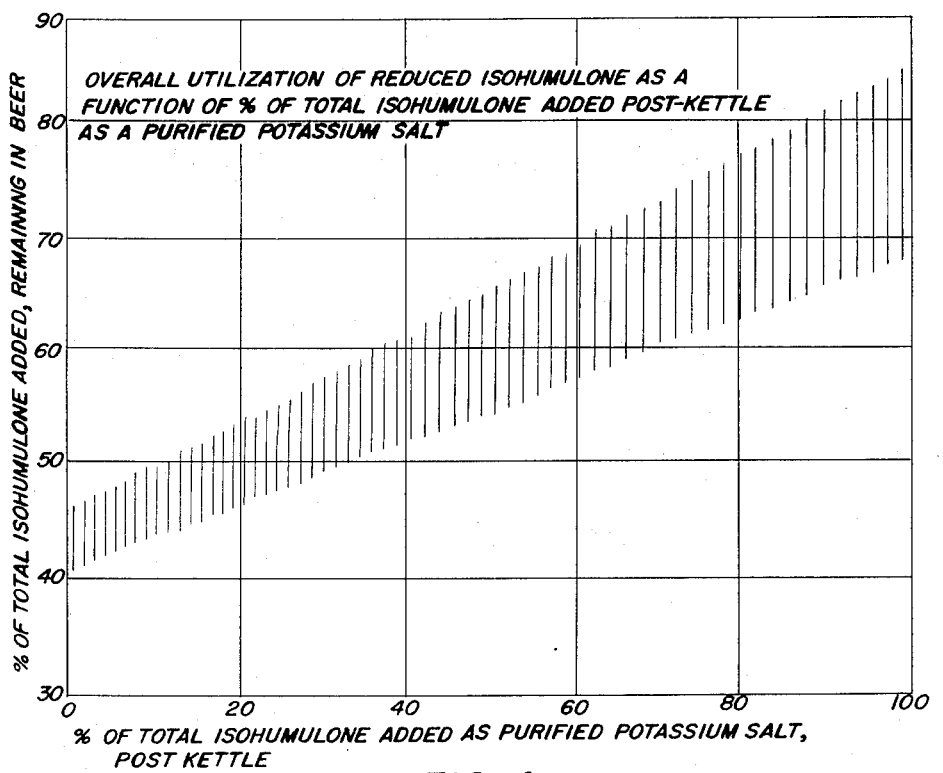
FIG. 4 shows utilization of reduced isohumulone as a function of percent of total isohumulone added post kettle.

(5) Addition to beer.—As we have mentioned, the hexane extract remaining after the aqueous KOH extraction, diminished by about 0.1–0.75 of its content of isohumulone, is then stripped of its hexane (or other solvent) content under reduced pressure in the known way, leaving the hop solids as a soft sticky mass containing all the lupulones and all the isohumulone (optionally reduced) that were not extracted in the aqueous KOH extraction step. This fraction is added to the wort before boiling the wort; which is to say, this fraction is added to the kettle. The amount added can vary over a fairly wide range and will be discussed in more detail below. In this connection, it is recognized that the utilization of isohumulone added to the wort varies inversely with the concentration added. For example, when adding 10 to 15 p.p.m. of isohumulone to wort the ultimate yield in the finished product can well be 50 to 60%. Conversely, when adding 60 to 70 p.p.m. of isohumulone to wort the ultimate yield in the finished product may be 20 to 40%. Therefore, adding lower quantities of isohumulone to the kettle further enhances its utilization in the entire brewing process. This correlation is shown in FIG. 4, which summarizes a number of runs involving isohumulone to the kettle, and post kettle. The data are presented as a band owing to variations in data caused by variations in different conditions under which the date were gathered. A qualitative trend, however, is certainly evident.

FIG. 4 shows the variation and utilization of isohumulone in the finished product as a function of the percentage of total isohumulone added to the beer as a potassium salt in post kettle fashion. Note that the percentages reflecting that quantity of isohumulone which remains in the beer are based on measurements made by extinction coefficient of reduced isohumulone. These values will not be totally consistent with the traditional Bitterness Unit values characteristically used by the industry. Nevertheless, percentages remaining in the beer will be accurate. Note that when all the reduced isohumulone is added to the kettle, only 40 to 45% remains in the finished product. Conversely, when all isohumulone is added post kettle, 65 to 85% remains in the finished beer. Combinations of kettle-post bettle addition reflect intermediate utilization as shown in FIG. 4. The increase savings accured by adding increasing percentages of isohumulone post kettle are obvious, since in the subject process none of the isobumulone is lost. Because none of the isohumulone is lost, the increased utilization is truly reflected in increased economy. The ratio of post kettle/kettle isohumulone addition chosen is dependent upon many brewing factors such as the ultimate desired properties of beer, the concentration of wort used in brewing, the bacteriostatic protection desired from isohumulone during fermentation, and many other routine brewing process steps.

The amount of isohumulone to be added to the kettle will be dictated by the brewers' choice of ultimate properties recognizing however that increasing the amount of post kettle added isohumulone will further enhance foam properties in addition to being increasingly economical. Hence, the ratio of post kettle to kettle addition of isohumulone and therefore the percent of purified isohumulone to be recovered from the extract will be dictated by properties desired in the finished product, viz bitterness, and foam stability and adhesion. In the subject process, both fractions can of course be utilized to a maximum extent to obtain substantially any predetermined final isohumulone content. Because utilization of post kettle added isohumulone exceeds 65%, increased quantities added post kettle will result in increased economy. One consequence of this system is that the total hops required for a given amount of beer will be reduced by about 25%. Since the hop (on a weight basis) is the most expensive single ingredient of beer, this invention can result in substantial economies in the brewery. (This will be further explained below.)

With respect to the reduced isohumulone fractions, we prefer to add, of the purified fraction, about 5 to 50 p.p.m. to beer, post kettle. Within this range, 10 to 20 is most preferred. Of the residual fraction (that recovered from hexane solution), we prefer to add 70 to 10 p.p.m. to the wort, in the kettle (during or prior to the boil being the same for our purposes). Within this range, 45 to 20 p.p.m. is most preferred. In general, it is convenient to add the residual extract at the kettle at the above rates and its complementary aqueous extract concentrate post kettle, whatever the latter may amount to in the way of p.p.m. It is our intent to conclude with the same p.p.m. of final isohumulone in the beer as is customary in the prior art, but with the advantage that less original hops are required to achieve this.

It will be appreciated that the two fractions derived from a given hexane extract do not have to be added to the same batch of wort/beer. In fact, such would be the exception rather than the rule, since each fraction, on being recovered, will normally be stored and/or pooled with like fractions from prior extractions, and it would be pointless to attempt to match up two given complementary fractions to the same wort/beer brew. The essential thing, as we have mentioned, is that the pure isohumulone fraction be added post kettle and the complementary residual fraction be added to the kettle, it being of no consequence whether they are added to the same or different brews. As a corollary, it follows that to the same brew can be added (i.e., to the kettle) the extract fraction diminished by a KOH extraction, and later, post kettle, there can be added a pure potassium isohumulate extract, whether or not derived from the starting hop extract the residue of which was added to the kettle. The excellent transportation and storage characteristics of the potassium isohumulate concentrate permit its use months after its preparation and in brewing operations thousands of miles from its place of manufacture.

So far as we are aware we are the first to discover that relatively high recovery of pure isohumulone can be obtained only over a very narrow pH range of extraction and that the resulting products each reflect optimum properties for ultimate use in the brewing process. For example, the recovered isohumulone, which is preferably in excess of 90%, is highly suited for post kettle addition yielding product properties reflecting improved foam and hop characteristics, provides for the desired degree of bacteriostatic protection during wort fermentation, and furthermore provides inhibition of excess foam during brew kettle boil.

It is known that some improvement in isohumulone utilization can be obtained when using high purity isohumulone added to the brew kettle. However, when such additions are made without the benefit of residual hop resins, excessive foam generation occurs making it impossible to execute a normal brew kettle boil. It is, therefore, concluded that for conventional operations, some of the foam inhibitor components normally associated with hops are required for conventional brewing operations.

In the past, practitioners and scientists producing purified isohumulone have incurred a typical loss of 20% of the isohumulone when attempting to recover very high quantities of these isohumulones from an extract. Such losses have been documented in processes using various liquid extraction procedures. The process of our invention is much more efficient because no isohumulone is lost during these operations.

The economies possible in our new process are readily demonstrable.

Consider the amount of isohumulone required to hop 1000 bbl. of beer to a level of 25 p.p.m. of reduced isohumulone in the finished product, in this invention, as compared to usage in the prior art. This is given in the following table. The argument is similar for regular isohumulone and precludes the technique used for isomerization as known to those skilled in the art of hop technology.

TABLE 5

|  | Prior art | | This invention at 50/50 [2] | |
| --- | --- | --- | --- | --- |
|  | Iso [1] | Lbs. iso,[1] 1,000 bbl. | Iso [1] | Lbs. iso,[1] 1,000 bbl. |
| Addition to kettle | [3] 55.5 | 14.4 | [3] 20 | 5.2 |
| Addition post kettle | [3] 0.0 |  | [3] 20 | 5.2 |
|  | [1] 55.5 |  |  |  |
| Percent utilization (combined) | 45 |  | 63 |  |
| Finished product | 25 |  | 25 |  |
| Total iso (lbs.) |  | 14.4 |  | 10.2 |

[1] Iso refers to isohumulone; in this case, reduced.
[2] I.e., a 50% KOH extraction leaving a residue containing 50% of the original isohumulone.
[3] Parts per million.

NOTE.—Saving in iso $\frac{14.4-10.4}{14.4} = \frac{4.0}{14.4} = 27.7\%$. The anticipated dollar savings with pure iso from this process costing 8% more than the non-purified iso is: $\frac{(14.4)\ (1)-5.2+5.2\ (1.08)}{14.4} = \frac{3.6}{14.4} = 25\%$ dollar savings.

A FINAL SUMMARY

Our description preceding may be partially summarized in tabular form, bearing in mind that the data are applicable to the general case, as derived mainly from hexane extract data.

TABLE 6

|  | Reduced isohumulone | | | Unreduced isohumulone | | |
| --- | --- | --- | --- | --- | --- | --- |
|  | Typical broad range (approx.) | Preferred | Optimal | Typical broad range (approx.) | Preferred | Optimal |
| pH | [1] 5.5–8.1 | [1] 5.8–7.8 | 6.6 | [1] 5.2–7.0 | [1] 5.5–6.7 | 6.0 |
| Percent extracted | [1] 10–75 | [1] 30–70 | 45 | [1] 45–70 | [1] 50–65 | 56 |
| Water:hop solvent volume ratio | [2] 0.1–3.0 | 0.2–2.0 | 1.0 | [2] 0.1–3.0 | 0.2–2.0 | 1.0 |
| P.p.m. to beer: |  |  |  |  |  |  |
| Kettle | 100–5 | 70–10 | 45–20 | 100–5 | 70–10 | 45–20 |
| Post kettle | 2–80 | 5–50 | 10–20 | 2–80 | 5–50 | 10–20 |
| Percent concentrate, K salt | 30–80 | 35–45 | 35–38 | 30–80 | 35–45 | 35–38 |

[1] Requires selection of proper water:solvent ratio, herein described, to give 90%+purity.
[2] Requires selection of proper pH, herein described, to give 90%+ purity.

EXAMPLES 42–47

KOH extraction of hop extract in trichlorethylene extremely high isohumulone yields without jeopardizing physical stability. Furthermore, the remaining product of decreased isohumulone content is highly suitable for use in the brew kettle because it allows retention of original This example demonstrates the universality of this invention, with respect to a known, but little used hop extract solvent. The hop variety used was bullion hops. In this series of examples the sodium borohydride reduced whole hop extract manufactured according to U.S. Pat. 3,558,326 was dried free of hexane and redissolved in trichlorethylene. One volume of this solution was then contacted with 0.75 volume of water adjusted to increasing pH's, starting with 4.88. In all cases, we started with 35.3 grams of solid in 100 ml. of trichlorethylene. Percent purity and recovery of reduced isohumulone are given in Table 7 following. Thus, in Example 42, on adjusting the aqueous phase to a pH of 4.88, we recovered a material which was 63.9% pure reduced isohumulone, which represents a yield of 6.2% of the original isohumulone in the starting trichlorethylene extract.

TABLE 7

| Example: | Extraction pH | Purity of extracted isohumulone, percent | Percent of original isohumulone extracted |
|---|---|---|---|
| 42 | 4.88 | 63.9 | 6.2 |
| 43 | 5.92 | 89.4 | 12.1 |
| 44 | 6.92 | 88.7 | 24.3 |
| 45 | 8.00 | 91.5 | 37.0 |
| 46 | 9.12 | 61.6 | 74.9 |
| 47 | 10.00 | 57.5 | 83.2 |

The data in Table 7 are obviously qualitatively similar to the data for KOH extractions of reduced and unreduced hop extract in hexane, as given in Tables 1 and 2, and shown graphically in FIG. 5. That is to say, percent extracted increases almost in proportion to pH, whereas purity at first rises, peaks over a fairly narrow pH range, then drops steeply. It will also be obvious from the data, that when using trichlorethylene extracts, a highly suitable KOH extraction can be made at a pH of 8, which gives a purity of 91.5% and a yield (based on original isohumulone) of 37.0%. Again, the 37% extract is added to the wort post-kettle, while the residue (about 63%) is stripped of its trichlorethylene using conventional technique and added to the kettle. If desired, of course, not all the 37.0% extract has to be added. Also, previously mentioned, it is desirable to concentrate the KOH aqueous extract to 30% or more potassium isohumulate before use.

Slight variations will be obtained when using ratios of water:solvent other than the 0.75:1 used above, as well as when using unreduced hop extracts, or when using a different hop variety. However, the general procedure is applicable for all these variations, to wit, to make several runs at various pH's establish purity and yield curves, and from the curves select conditions that give a product with at least 90% purity and at least 20% yield. (We bear in mind that when using a "split" of 10% and 90%, the purity of the 10% fraction can be as low as 80%, owing to the relatively small amount of haze-forming lupulones that accompany such fraction.)

MISCELLANEOUS

Following the practice of the art, the terms "humulone," "isohumulone," and "lupulone" are used interchangeably in the singular and the plural to mean the same respective products, it being understood that "humulone" or "humulones" actually refers to a group of generally homologous compounds making up the class of alpha hop acids; "isohumulone" refers to their (so-called) "isomerized" forms; "reduced" refers to their reduced forms (cf. Koch, U.S. Pat. 3,044,879); and lupulone (or lupulones) refers to the homologous group of beta hop acids.

By "post kettle addition" is meant the addition of the purified isohumulone (reduced or nonreduced) to the brew at any time after it leaves the kettle, and before the finished beer is placed in containers. As a matter of convenience, we generally add the purified isohumulone after fermentation.

Thoughout, "wt./wt." means weight of solid in weight of solution. Thus, 5% (wt./wt.) potassium isohumulone in aqueous solution means 5 g. of the salt in 100 g. of total solution. The solution would thus consist of 5 g. potassium isohumulate and 95 g. water.

Unless otherwise expressed herein, the same process steps stated for reduced isohumulone are substantially equally applicable to non-reduced isohumulone. (As will be noted, however, the recovery and purity curves for the two materials, although qualitatively quite similar, are measurably different.)

Most of the references herein are to reduce isohumulone, and when the text does not state whether reduced or non-reduced isohumulone is meant, the former is to be understood.

"Hexane" as used in the examples means commercial n-hexane. However, all hexane isomers are operable.

Although our work has been exemplified primarily with hexane and trichlorethylene, we emphasize that any of the conventional water-immiscible hop solvents are technically feasible. The list of such solvents is large indeed and includes solvents such as heptane, octane, isooctane, petroleum ether, pentane, toluene, chloroform, methylene chloride, dichloromethane, carbon tetrachloride, tetrachloroethylene, diethyl ether, and the like.

What is claimed is:

1. The method of treating a preisomerized hop extract containing reduced or unreduced isohumulone dissolved in a water-immiscible hop solvent comprising
    (A) extracting said hop extract with dilute aqueous KOH at a pH of 5.5–8.1 in the case of reduced isohumulone and 5.2–7 in the case of unreduced isohumulone, and water:solvent ratio of 0.1–3:1 to provide
        (a) an aqueous potassium isohumulate at least 80% pure and containing at least 10% of the original isohumulone and
        (b) a hop extract residue containing the rest of the original isohumulone;
    (B) concentrating the said aqueous potassium isohumulate to at least 30% potassium isohumulate:
    (C) in a beer-making operation, adding the concentrate to wort post kettle in an amount to provide 2–80 parts per million reduced or unreduced isohumulone;
    (D) removing hop solvent from the hop extract residue obtained in A(b); and
    (E) adding the solvent-free extract to the wort in the kettle in an amount to provide 5–100 parts per million reduced or unreduced isohumulone.

2. The method according to claim 1 in which in A the aqueous potassium isohumulate is at least 90% pure and contains at least 20% of the original isohumulone.

3. The method according to claim 2 in which the hop solvent is hexane.

4. The method according to claim 2 in which the hop solvent is trichlorethylene.

5. The method according to claim 1 in which the hop extract is reduced.

6. The method according to claim 1 in which the worts in C and E are the same wort.

7. The method according to claim 1 in which the worts in C and E are different worts.

8. The method according to claim 1 in which in A the pH in the case of reduced isohumulone is 5.8–7.8 and in the case of unreduced isohumulone is 5.5–6.7, and the water:solvent ratio is 0.2–2; in B the potassium isohumulate is concentrated to 35–45%; in C the amount of reduced or unreduced isohumulone is 5–50 parts per million; and in E the amount is 10–70 parts per million.

9. The method according to claim 8 in which in A the pH in the case of reduced isohumulone is 6.6 and in the case of unreduced isohumulone is 6, and the water:solvent ratio is 1; in B the potassium isohumulate is concentrated to 35–38%; in C the amount of isohumulone is 10–20 parts per million; and in E the amount is 20–45 parts per million.

10. The method of adding hop extracts to a beer-making operation comprising:
(A) adding during the kettle operation, in an amount to provide 5–100 parts per million reduced or unreduced isohumulone, a hop extract residue prepared by carrying out a liquid-liquid extraction of a starting isohumulone- or reduced isohumulone-containing hop extract in a water-immiscible hop solvent by treatment of the extract with dilute aqueous KOH at a pH in the range of about 5.5–8.1 in the case of reduced isohumulone and about 5.2–7 in the case of unreduced isohumulone, in which the water:solvent ratio is about 0.1–3:1, thereby to provide
 (a) a first extract, being a solution of potassium isohumulate in water and which is then concentrated to at least 30% weight of solid in weight of solution, having the pH adjusted to at least 7.0, and at most 11.0, and containing 0.1–0.75 of the total isohumulones in the starting hop extract, said value, when in the range 0.2–0.75, containing not more than about 10% of hop extract-derived impurities based on the content of potassium isohumulate in the aqueous extract, and when in the range of 0.1 to less than 0.2, not more than 20% of such impurities;
 (b) and a hop extract residue, said hop extract residue consisting essentially of the solvent-dissolved remainder of the starting hop extract and being the hop extract residue of A above; and
(B) adding to the same wort post kettle an aqueous potassium isohumulate prepared by the procedure stated in A(a) in an amount to provide 2–80 parts per million reduced or unreduced isohumulone.

11. The method according to claim 10 in which the aqueous potassium isohumulate extract is concentrated under reduced pressure to about 35–38% wt./wt. before being added post kettle.

12. The method according to claim 10 in which in A, hop extract residue is added in an amount to provide 10–70 parts per million; the pH in the case of reduced isohumulone is 5.8–7.8 and in the case of unreduced isohumulone is 5.5–6.7; and the water:solvent ratio is 0.2–2; in A(a) the potassium isohumulate is concentrated to 35–45%; and in B, the aqueous potassium isohumulate is added to provide 5–50 parts per million.

13. The method according to claim 12 in which in A, the hop extract residue is added in an amount to provide 20–45 parts per million; the pH in the case of reduced isohumulone is 6.6 and in the case of unreduced isohumulone is 6; and the water:solvent ratio is 1; in A(a) the potassium isohumulate is concentrated to 35–38%, and in B, the aqueous potassium isohumulate is added to provide 10–20 parts per million.

References Cited

UNITED STATES PATENTS

| | | | |
|---|---|---|---|
| 3,044,879 | 7/1962 | Koch et al. | 99—50.5 |
| 3,364,265 | 1/1968 | Klingel et al. | 99—50.5 X |
| 3,536,495 | 10/1970 | Fly et al. | 99—50.5 |
| 3,558,326 | 1/1971 | Westermann et al. | 99—50.5 |
| 3,607,298 | 7/1971 | Mitchell | 99—50.5 |
| 3,607,300 | 7/1971 | Mitchell | 99—50.5 |

JOSEPH M. GOLIAN, Primary Examiner

UNITED STATES PATENT OFFICE
CERTIFICATE OF CORRECTION

Patent No. 3,798,332  Dated March 19, 1974

Inventor(s) Westermann, Chicoye, and Hoffmann

It is certified that error appears in the above-identified patent and that said Letters Patent are hereby corrected as shown below:

Page 1, in the title, "Hot" should read --Hop--.

Col. 6, Table 1, for Example 3, "5.8" should read --5.68--;

for Example 10, "27.8" should read --27.3--.

Col. 12, line 59, "isobumulone" should read --isohumulone--.

Col. 14, Table 5, "$^1$ 55.5" should read --$^3$ 55.5--; and "25" (both occurrences) should read --$^3$ 25--.

Col. 16, line 39, ":" should read --;--.

Signed and sealed this 1st day of October 1974.

(SEAL)
Attest:

McCOY M. GIBSON JR.
Attesting Officer

C. MARSHALL DANN
Commissioner of Patents